Figure 4:
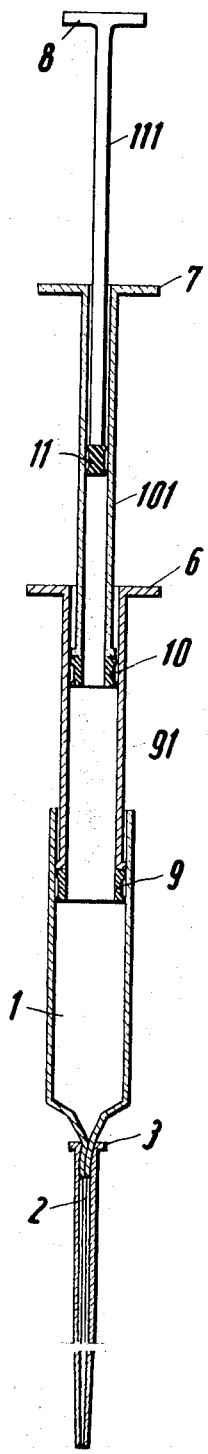

United States Patent
Sokol

[15] 3,660,037
[45] May 2, 1972

[54] DEVICE FOR MEASURING BLOOD SEDIMENTATION RATE

[72] Inventor: Kurt Rudolf Sokol, Schwachhauser Heerstr. 295, 28 Bremen, Germany

[22] Filed: Aug. 10, 1970

[21] Appl. No.: 62,256

[52] U.S. Cl. ..........................23/253 R, 23/230 B, 23/259, 73/61.4, 128/2
[51] Int. Cl. ..................B01l 3/00, G01n 15/04, G01n 33/16
[58] Field of Search..................23/253, 230 B, 259; 73/61.4; 128/2 G

[56] References Cited

UNITED STATES PATENTS 2,102,785  12/1937  Brooks..............................23/230 B Primary Examiner—Morris O. Wolk
Assistant Examiner—R. M. Reese
Attorney—Olson, Trexler, Wolters and Bushnell

[57] ABSTRACT

A unitary device comprising a cannula and a syringe barrel of rather large diameter for withdrawing blood, combined with one or more telescoping cylinders of relatively smaller diameter in which the sedimentation rate is measured.

8 Claims, 6 Drawing Figures

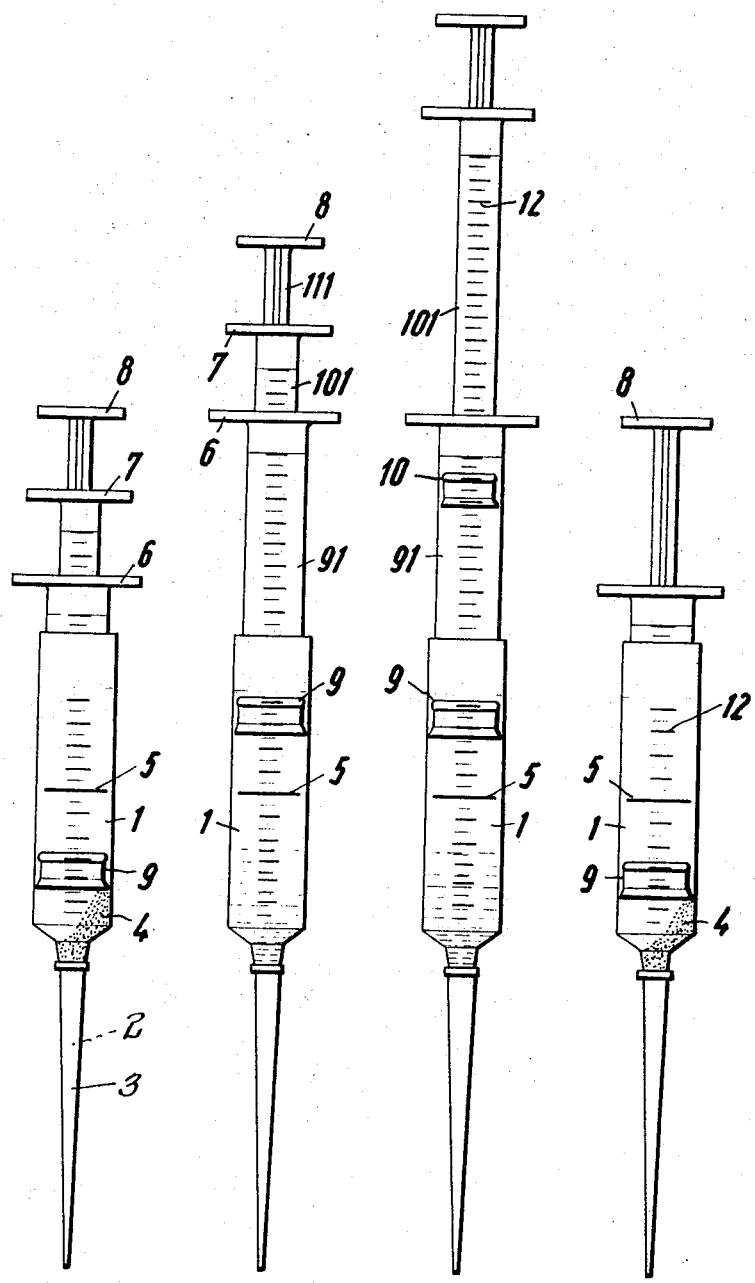

Inventor:
Kurt Rudolf Sokol
By: Olson, Trexler, Wolters & Bushnell
Attys.

DEVICE FOR MEASURING BLOOD SEDIMENTATION RATE

The present invention is concerned with a device for measuring the sedimentation rate of erythrocytes, or red blood cells, by means of a relatively narrow or small diameter measuring tube having a cannula unitarially interconnected therewith by means of a unit for aspiration of blood through the cannula into the measuring tube.

One of two procedures is commonly used for the measuring of sedimentation rate. In accordance with one of these procedures, known as the Westergren procedure, the distance which the upper end of an erythrocyte column in a measuring vessel travels during a certain period of time. Conveniently, a 1-hour time period is used. During this time period the upper end of the red color, i.e., the top of the erythrocytes, drops as a function of various external parameters, including the length and diameter of the tube used as a measuring vessel, the temperature, the type and extent of anti-coagulant added, the sex of the patient, and various diseases from which the patient may suffer. Values generally will lie between 3 mm and more than 50 mm. The smaller values are considered to be the normal ones.

According to the Linzenmayer procedure, a measurement is made of the time required for the upper red color edge of a column of blood to pass from the starting mark to a second mark located at a selected spot on the measuring vessel.

In both cases the measuring vessel usually comprises a tube of 20 to 30 cm length with a diameter of about 2.5 mm must be filled with a mixture of blood and an anti-coagulant. Prior to this, the blood must be collected from the person to be examined. It has been common practice to use a standard syringe for extraction of the blood into which has been aspirated 0.4 cc sterile and isotonic sodium citrate solution. Subsequently blood is aspirated from a vein into the syringe until the 2 cc mark is reached.

As is known, sterility of syringes is of the utmost importance to avoid transmission of disease. Hepatitis is easily transmitted in this manner. To ensure sterility it has been the practice to boil each syringe 20 minutes in a suitable antiseptic solution, such as a "Desogen" solution of 1 to 2 percent strength. The needle or cannula must be sterilized in the same manner. The blood so collected is thoroughly mixed with the sodium citrate in the syringe by shaking the syringe. The blood is then expelled from the syringe into the measuring vessel so that the blood column will reach a certain height, commonly 20 cm. Transfer of the blood from the initial syringe into the measuring vessel requires time and a certain degree of skill, and entails the possibility of contamination. The necessity of sterilization for each operation introduces a time factor which often requires a patient to have to wait an extended period for his turn. Such drawbacks have prompted many physicians to eliminate blood sedimentation rate determinations in the physician's office, whereby it is necessary for the patient requiring such a test to go to a laboratory specializing in this type of work.

In an effort to overcome the foregoing difficulties, it has been proposed in West German Pat. No. 869,645 that a measuring vessel should be used having a cannula directly affixed thereto and under a negative pressure (i.e., less than atmospheric), so that the blood is aspirated by the negative pressure directly into the measuring vessel when the cannula is inserted into a vein. This device has certain drawbacks. Filling of the vessel to the desired value is difficult, and requires considerable skill, since the amount of blood which the device tends to aspirate will fluctuate from one patient to another and from one sample to another, due to variations in manufacturing and storage, resulting in variations in negative pressure. In order to maintain the negative pressure inside the vessel between the inner end of the cannula and the measuring vessel itself, there has been provided a membrane which remains closed until after the cannula has been inserted into a vein. After this the membrane is ruptured by a lateral motion of the measuring vessel. It is difficult to adjust the strength of the membrane so that it is ruptured only at the desired time. Since the diameter of the measuring vessel is necessarily, it is difficult to obtain a thorough mixing of the aspirated blood with the anti-coagulant in the vessel. Accordingly, such instruments have not found wide use in physicians' offices.

In accordance with U.S. Pat. No. 2,102,785, there is an instrument in which a cannula is connected at one end to a measuring vessel, the other end of the measuring vessel having a suction hose attached thereto. Negative pressure is supplied by aspiration. However, this device is rather clumsy due to the length of suction hose required. Furthermore, the aspiration of the blood requires a relatively long time, and again the blood must be measured quite accurately during aspiration. Again, it is difficult to mix the blood thoroughly with an anti-coagulant, whereby results are by no means uniform. Thus, the latter device likewise has not found wide use.

It is an object of the present invention to provide a unitary device for measuring blood sedimentation rate overcoming the advantages of the prior art.

Another object of the present invention is the provision of a device for measuring blood sedimentation rate which allows rapid collection of blood, thereby causing a minimum discomfort to the patient, and wherein it is not necessary to measure the amount of blood accurately during collection.

The present invention solves the foregoing and other problems, and fulfills the objects by providing a tubular measuring vessel of relatively small diameter and a cannula interconnected therewith by a device for aspirating blood through the cannula through the measuring vessel. Specifically, the cannula is connected directly to a tubular vessel, barrel, or syringe, which is in turn interfitted with a tubular measuring vessel in the form of a plunger or piston telescopically movable within the syringe barrel. The measuring vessel may comprise more than one telescope cylinder of relatively small diameter. A sedimentation scale extends across the cylinder or cylinders of the measuring vessel. In the preferred form of the invention the entire device comprises a synthetic resin or polymer which is packaged in sterile fashion, and which has a predetermined amount of anti-coagulant included before packaging. The device is used once only, and then thrown away, avoiding the necessity of sterilizing in the doctor's office.

The foregoing structure solves the prior art problems in a strikingly simple manner. The subdividing of the device into at least two sections, one of which serves essentially for the collecting of the blood, while the other (or others) serves for measurement of the blood column has the advantage that the blood is collected in a relatively large diameter vessel, whereby handling and guiding of the cannula is simple. Only a rather small stroke of the plunger or piston is required to extract the blood necessary for a measurement. Furthermore, the anti-coagulant is incorporated in this relatively large diameter portion for ready and thorough mixing with the blood. There is no possibility of contamination of the blood due to the unitary nature of the device, while the relatively small diameter of the measuring cylinder or tube portion leads to accurate measurement. The commonly used column height of 20 cm is readily retained in the present device. On the other hand, a shorter measuring length such as on the order of 10 cm is sufficient for most purposes, since a sedimentation rate of 50 to 60 mm during the first hour is on the unusual or high side. Thus, for ordinary cases, a two part vessel is sufficient, i.e., a vessel or device having one relatively large cylinder or barrel, and one small diameter piston or plunger. Such a device can be manipulated with the greatest of ease, and yet the length is sufficient for most measurements.

On the other hand, where truly unusually high sedimentation rates are expected or encountered, a measuring vessel may be used which consists of several barrels or cylinders telescoped together, wherein the first barrel or cylinder of relatively large diameter, forms the syringe barrel, while succeeding cylinders form the plungers, each for the preceding cylinder, the last plunger normally being solid.

Figure 6:
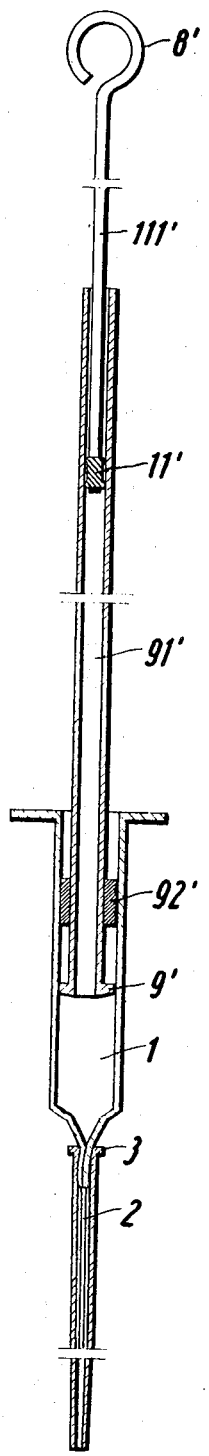

The invention will be readily understood from the following description when taken in connection with the accompanying drawings wherein:

FIGS. 1–3 show somewhat schematic side views of a device for measuring blood sedimentation rate in accordance with the present invention with the device in various stages of telescoping relation;

FIG. 4 comprises a somewhat schematic longitudinal sectional view through the device according to FIGS. 1–3 with the parts extended substantially to their fullest position;

FIG. 5 is a view generally similar to FIG. 1 of a modification of the invention wherein the barrel of the syringe forms a part of the measuring device; and, FIG. 6 is a longitudinal section generally similar to FIG. 4 of a further embodiment of the invention.

Before turning to the various embodiments in detail, it is to be noted that in no case has the device been drawn true to scale. On the contrary, in order to render the presentation clear, the diameter in each instance has been drawn somewhat too large, and the length somewhat too short with respect to commercial considerations.

In the embodiment disclosed in FIGS. 1–4, three barrels and three plungers are used. The largest diameter barrel 1 has at its lower end a cannula 2 which is provided with a protective cap 3 during storage. This barrel corresponds to the main portion of a commonly known syringe, and serves the purpose of collecting blood through the cannula 2 from a vein. An anti-coagulant 4 is provided in the lower portion of the cylinder or barrel 1 adjacent the cannula. This is an essential ingredient of the sedimentation rate determination, and for example, the anti-coagulant may comprise 0.4 cc sodium citrate.

As has been mentioned previously, the device is sub-divided into two portions, namely the syringe which serves for the collection of blood, and a measuring vessel interconnected with the syringe. The measuring vessel, as also noted, may comprise one or more cylinders. In the present embodiment of the invention, the syringe barrel or cylinder may serve as a part of the measuring vessel, and to this end the barrel or cylinder 1 is equipped with a scale-marker 5 used for measuring when the height of the blood column is adjusted. The scale-marker 5 also serves the purpose of indicating the smallest amount of blood which must be collected from the vein by aspiration.

Within the barrel or cylinder 1 is provided a plunger 9 comprising a sleeve made of elastic material such as rubber or plastic. The sleeve is located at the free or lower end of a tube forming a cylinder 91, the sleeve being fixed to the cylinder 91 and slidable within the barrel or cylinder 1 in sealing engagement therewith. A peripheral flange or handle 6 is provided at the upper or opposite end of the plunger 9.

A second plunger 10 is provided within the cylinder 91, being of smaller diameter, but otherwise of similar construction to the one just described. That is to say, the plunger 10 comprises a rubber or plastic sleeve fixed at the lower or free end of another cylinder 101 which is provided at the opposite or upper end with a peripheral flange or handle 7 by means of which the piston or plunger 10 may be slid to and fro within the preceding cylinder 91.

A plunger 11 is disposed within the cylinder 101 and includes a plastic or rubber sleeve as heretofore noted secured at the lower end of a piston rod or plunger rod 111 of solid construction. The plunger 11 thus closes the measuring vessel at the upper end. A peripheral flange or handle 8 is provided at the upper end of the piston rod 111 for telescoping the latter within the cylinder 101.

Summarizing the disclosure of FIGS. 1–4, the device comprises several parts telescopically mounted within one another. The barrel 1 with the cannula 2 and the plunger 9 serve for the collecting of blood, while the cylinders 91 and 101 with (if needed) a portion of the barrel 1 form the measuring vessel. In order that the sedimentation rate may be measured, a sedimentation scale 12 is provided at least on the cylinders 91 and 101. At the ends of the individual cylinders there are provided markers (not shown) by means of which the technician may visually determine how far the cylinders should be extended relative to one another, corresponding markers also be provided at the upper end of the cylinder 101 and on the lower portion of the piston rod 111. In cases where it is desired that the barrel 1 shall form a portion of the measuring vessel, the sedimentation scale 12 continues onto this cylinder or barrel, aligning marks again being provided between the barrel 1 and the cylinder 91 for determining the proper degree of extension.

As initially supplied, the parts are completely telescoped as shown in FIG. 1. To proceed with a sedimentation rate determination, the device is removed from its sterile wrapper (not shown), and the protective cap 3 is removed from the cannula 2. The cannula is then inserted into a vein. The plunger 9 then is withdrawn by means of the handle or flange 6 so that enough blood is aspirated to reach at least the level indicated by the scale-marker 5. The cannula 2 is then pulled out of the vein, and the handle 6 is pulled a bit further back to aspirate a small amount of air into the barrel 1. The blood then is thoroughly mixed with the anti-coagulant 4 by shaking the entire device.

Thereafter, the entire device is inverted so that the cannula 2 points upwardly. The individual plungers or pistons 9, 10 and 11 are extended by pulling the respective handles 6, 7 and 8 so that the respective pairs of markers on the barrels or cylinders will coincide with one another. If it is observed that the device contains too much blood, then a part thereof can be removed prior to the measurement by expelling it through the cannula 2 so that the column of blood to be measured will be of the desired length.

Thereafter, the entire device with the cannula 2 pointing upwardly is placed in a support (not shown). Such support may be equipped with a variety of tensioning devices and stops for extending the various plungers of the device, thus simplifying the adjustment thereof to the proper relative positions. However, as will be apparent, the extension can be done manually, and the support may be of any type to hold the device upright with the cannula oriented upwards. Further steps depend on the method used. In the case of the Westergren method or procedure, a period of 1 hour is allowed to pass, at which time the height of the red column is measured against the sedimentation scale 12 on the cylinders or barrels 1, 91, 101. After the required time has passed (which in special cases might extend for 2 hours or longer), the entire device is simply thrown away.

In the embodiment of the device shown in FIG. 6, there is again provided a barrel 1 having a cannula 2 thereon with a protective cap 3 thereover. In this embodiment, the barrel generally serves only for the purpose of collecting blood, and only in special cases might be used as a portion of the measuring vessel. The measuring vessel is formed by a relatively long cylinder 91' having a relatively small or narrow diameter. At the bottom end of the cylinder 91' there is secured a disc-shaped plunger 9' functionally equivalent to the sleeves heretofore disclosed. A sleeve 92' is secured within the upper end of the cylinder 91' and slidingly receives the plunger 9', thereby acting as a guide and preventing tilting or canting of the cylinder 91'.

A plunger or piston 11' slides within the cylinder 91' and is secured to the lower end of a piston rod 111'. The piston rod 111' preferably is somewhat longer than the total length of the cylinder 91', and has at its free or upper end a handle 8' in the form of a loop, or any other suitable shape. The embodiment of FIG. 5 is similar to that of FIGS. 1–4, except that it has only one hollow telescoping barrel or cylinder in addition to the barrel of the syringe, and in principle the embodiment of FIG. 6 corresponds to the embodiments of FIGS. 1–5. In either case the barrel 1 may serve as a part of the measuring vessel, if so desired, and the function is the same as described with regard to FIGS. 1–4. Sedimentation scales 12 are provided, and also a marker 5, and an anti-coagulant 4 is provided within the barrel 1.

The specific examples of the invention as herein shown and described are for illustrative purposes only. Various changes in structure will no doubt occur to those skilled in the art, and will be understood as forming a part of the present invention, insofar as they fall within the spirit and scope of the appended claims.

The invention is claimed as follows:

1. A device for measuring blood sedimentation rate comprising a syringe having a barrel of relatively large internal diameter and a cannula at one end thereof, a cylinder telescopically movable within said barrel and comprising a hollow tubular measuring device of relatively small internal diameter, and a plunger telescopically movable within said cylinder.

2. A device as set forth in claim 1 and further including a readout scale on at least said cylinder.

3. A device as set forth in claim 1 made of a synthetic polymer and having therein an anti-coagulant.

4. A device as set forth in claim 1 and further including a second cylinder of relatively smaller internal diameter received within the first cylinder and telescopically movable with relation thereto.

5. A device as set forth in claim 1 wherein the barrel and the cylinder are provided with marks for visual alignment to determine the degree of telescopic extension desired.

6. A device as set forth in claim 1 wherein the barrel has a mark thereon establishing the minimum volume of blood to be collected.

7. A device as set forth in claim 1 and further including a seal between said cylinder and said barrel and slideable with respect to at least one portion thereof.

8. A device as set forth in claim 1 wherein the cylinder is of much smaller outside and inside diameter than the inside diameter of said barrel and is much longer axially than said barrel, and further including a sleeve intermediate said barrel and said cylinder and serving as a guide.

* * * * *